US006663528B1

United States Patent
Haka

(10) Patent No.: US 6,663,528 B1
(45) Date of Patent: Dec. 16, 2003

(54) DUAL CLUTCH PLANETARY MANUAL TRANSMISSION WITH SWITCHED OUTPUT

(75) Inventor: Raymond James Haka, Brighton, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/166,809

(22) Filed: Jun. 11, 2002

(51) Int. Cl.[7] .................................................. F16H 3/44
(52) U.S. Cl. ........................ 475/303; 475/269; 475/271; 475/284
(58) Field of Search ................................. 475/303, 271, 475/284, 269

(56) References Cited

U.S. PATENT DOCUMENTS

| 3,733,928 A | * | 5/1973 | Uozumi et al. ............. 475/278 |
| 3,971,268 A | * | 7/1976 | Murakami et al. .......... 475/276 |
| 4,531,428 A | * | 7/1985 | Windish ...................... 475/279 |
| 4,683,776 A | * | 8/1987 | Klemen ....................... 475/286 |
| 5,049,116 A | * | 9/1991 | Asada ......................... 475/269 |
| 5,520,588 A | * | 5/1996 | Hall, III ...................... 475/218 |
| 5,879,264 A | * | 3/1999 | Raghavan et al. ........... 475/280 |
| 5,924,951 A | * | 7/1999 | Winzeler et al. ............. 475/275 |
| 5,951,432 A | * | 9/1999 | Wehking et al. ............. 475/280 |
| 5,984,825 A | * | 11/1999 | Hebbale et al. ............. 475/286 |
| 6,083,135 A | * | 7/2000 | Baldwin et al. ............. 475/276 |
| 6,217,474 B1 | * | 4/2001 | Ross et al. .................. 475/269 |
| 6,558,287 B2 | * | 5/2003 | Hayabuchi et al. ......... 475/271 |
| 2002/0183154 A1 | * | 12/2002 | Ziemer ........................... 475/5 |

FOREIGN PATENT DOCUMENTS

DE        010043588 A1 *  7/2001   ............. F16H/3/44

* cited by examiner

Primary Examiner—Saul Rodriquez
Assistant Examiner—David D. Le
(74) Attorney, Agent, or Firm—Leslie C. Hodges

(57) ABSTRACT

A power transmission has two selectively engageable input clutches, four selectively manipulatable synchronizer clutches, and a planetary gearset. The input clutches and the synchronizer clutches are manipulated to establish at least seven forward power paths and a reverse power path between an input shaft and an output shaft. Interchanges between adjacent speed ratios are controlled by preselecting the synchronizer condition and then interchanging the selectively engageable input clutches.

6 Claims, 2 Drawing Sheets

DUAL CLUTCH PLANETARY MANUAL TRANSMISSION WITH SWITCHED OUTPUT

TECHNICAL FIELD

This invention relates to power transmissions and, more particularly, to power transmissions having two input clutches and a plurality of synchronously engaged transmission ratios.

BACKGROUND OF THE INVENTION

Dual clutch transmission arrangements are generally found with countershaft-type transmissions. That is, these arrangements have a main central shaft and a pair of parallel countershafts and an output shaft. The main central shaft has two clutch arrangements which are operable to selectively interconnect the main power shaft through a head gear set with respective countershafts. The countershafts support a plurality of rotating gear members, which are disposed in continuous mesh with a series of gears and the output shaft.

A ratio interconnection between the countershaft and the output shaft are made by way of a synchronizer or mechanical clutch. The mechanical clutches are arranged such that when the first input clutch is transmitting power, the power path of the second input clutch is free to permit synchronous selection of the on-coming ratio. Then, by swapping the first input clutch for the second input clutch, the power path is changed from the first countershaft to the second countershaft. This permits the stepping of ratios by pre-engaging the nonpower transmitting shaft with the oncoming clutch prior to swapping the input clutches. These types of transmissions have been published in many documents and are well known in the art.

It is also well known that to provide multiple speeds, for example, seven, a dual clutch countershaft-type transmission will require nine and one-half pairs of external gears. This includes two head gear set pairs, one pair each for each forward ratio (other than the direct drive), and one and one-half pairs for a reverse ratio. This transmission will also require four two-way synchronizers.

SUMMARY OF THE INVENTION

It is an object of the present invention to provide an improved dual input clutch power transmission incorporating planetary gearsets.

In one aspect of the present invention, a plurality of planetary gearsets are arranged for interconnection with each other.

In another aspect of the present invention, the planetary gear members are interconnectible with the input shaft through a pair of synchronizers, a ground member through a synchronizer, and the output shaft through a synchronizer.

In yet another aspect of the present invention, at least two of the synchronizers are interconnected with respective ones of the input clutches.

In still another aspect of the present invention, three two-way synchronizers and one three-way synchronizer (engages A or B or A and B) are employed to establish in cooperation with the input clutches at least seven forward speed ratios and one reverse speed ratio.

In a further aspect of the present invention, the three-way synchronizer is arranged between two of the planetary members and the output shaft of the transmission.

In a still further aspect of the present invention, two of the synchronizers or mechanical clutches are arranged in series with the input clutches to establish four input power paths to the transmission.

In yet still a further aspect of the present invention, one of the synchronizers is arranged to provide two torque paths between the transmission members and a ground member.

In a yet still further aspect of the present invention, one of the synchronizers is arranged to provide a torque-transmitting connection between two of the planetary members and the output shaft of the transmission.

In another aspect of the present invention, two of the synchronizers are arranged to provide four input nodes to the power transmission, one of the synchronizers is arranged to provide two ground nodes for the power transmission, and one of the synchronizers is arranged to provide two output nodes for the power transmission.

With the present invention, there are seven speed ratios found within the planetary portion of the transmission. There are three underdrive ratios, a direct drive ratio, and three overdrive ratios. The underdrive ratios are all established using the same ground node and the same output node, while the input node is changed. The overdrive ratios are established by using a common ground node and input nodes similar to the underdrive ratios but with a different output node. During the fourth or direct ratio, the synchronizers undergo a plurality of swaps to establish the proper output node for the overdrive ratios.

DESCRIPTION OF EXEMPLARY EMBODIMENTS

Figure 1:
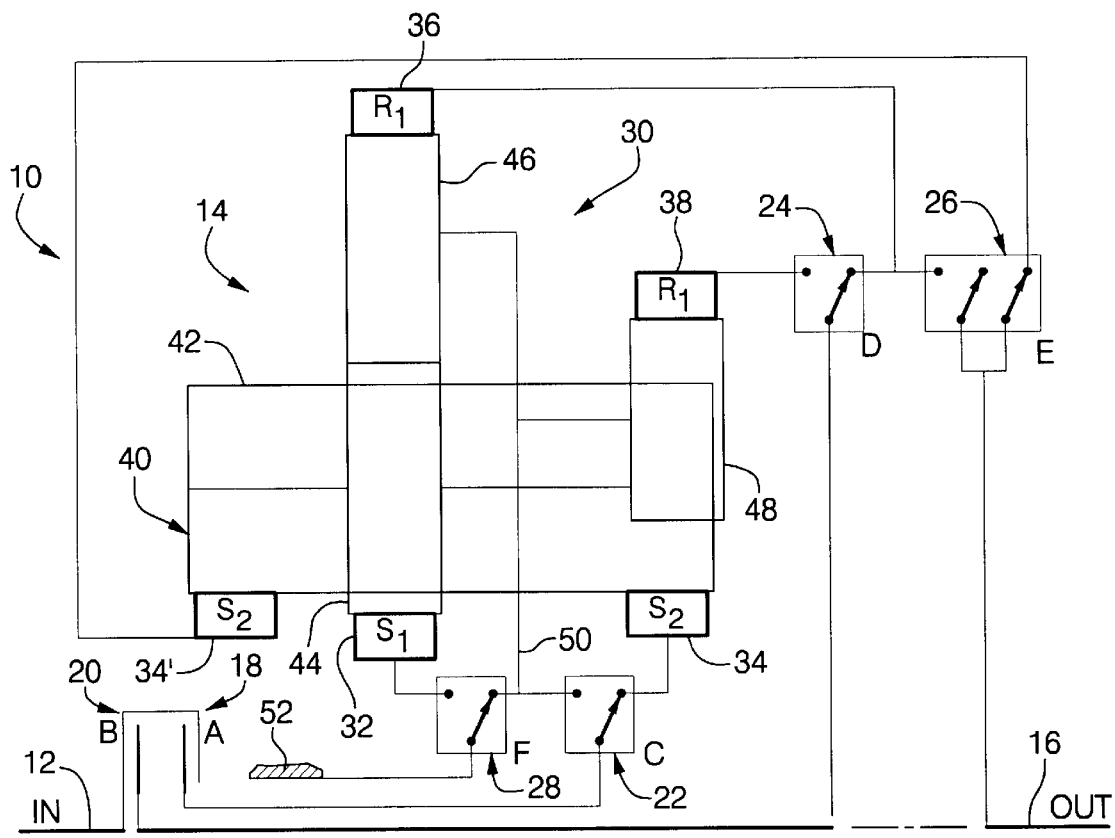
FIG. 1 is a schematic representation of one embodiment of the present invention.

Referring to the drawings, there is seen in FIG. 1 a power transmission 10 having an input shaft 12, a planetary transmission 14, and an output shaft 16. The planetary transmission 14 includes two selectively engageable input clutches 18 and 20, four selectively switchable mechanical clutches or synchronizers 22, 24, 26 and 28, and a planetary arrangement 30. A planetary arrangement 30 includes a first sun gear member 32, a second sun gear member 34 and 34', a first ring gear member 36, a second ring gear member 38, and a planet carrier assembly member 40.

The planet carrier assembly member 40 has a long pinion gear member 42, a first short pinion gear member 44, a second short pinion gear member 46, and a third short pinion gear member 48. The long pinion gear member 42 meshingly engages the sun gear members 34 and 34', the short pinion gear member 44, and the short pinion gear member 48. The short pinion gear member 44 also engages the short pinion gear member 46, which in turn engages the ring gear member 36. The short pinion gear member 48 also engages the ring gear member 38. The pinion gear members 42, 44, 46, and 48 are rotatably mounted on a planet carrier member 50 in a conventional manner. Since the sun gear members 34 and 34' are interconnected by the long pinion gear member 42, they rotate in unison.

Figure 2:
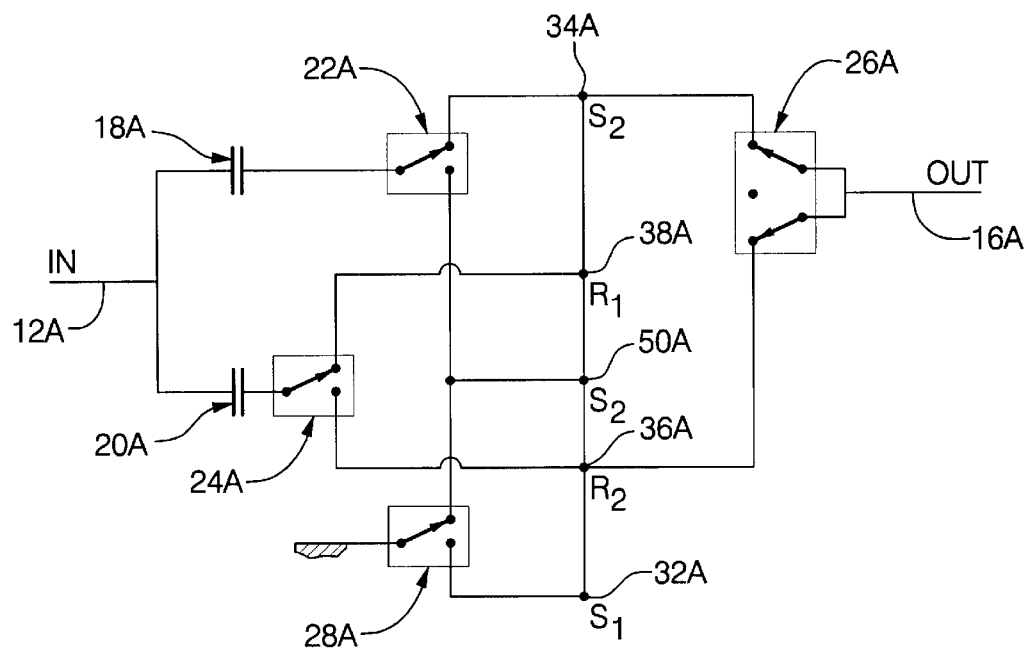
FIG. 2 is a lever diagram representing the schematic representation of FIG. 1.

The sun gear members, the ring gear members, and planet carrier member are shown in the lever diagram of FIG. 2 utilizing the same numerical designations with an "A" suffix. For example, the sun gear member 32 is represented by the point 32A. The synchronizers or mechanical clutch assemblies 22, 24, and 28 are conventional two-way synchronizers, and the synchronizer assembly is a conventional three-way synchronizer or mechanical clutch. These devices are given the same numerical designation in FIG. 2 with an "A" suffix.

As seen in FIG. 1, the input clutch 18 is selectively engageable between the input shaft 12 and the mechanical clutch 22. The input clutch 20 is selectively engageable between the input shaft 12 and the mechanical clutch 24. The mechanical clutch 22 is selectively connectible with the sun gear member 34, and therefore 34', and the planet carrier member 50. The mechanical clutch 24 is selectively connectible with the ring gear member 36 and the ring gear member 38, individually. The mechanical clutch 26 is selectively operable to connect the output shaft 16 selectively the ring gear member 36 and the sun gear member 34'. Thus, the mechanical clutch 26 is a three-way synchronizer. The synchronizer or mechanical clutch 28 is selectively connectible between the sun gear member 32 and a ground element or member 52, and between the planet carrier member 50 and the ground element 52.

It should be evident now that the input shaft 12 is selectively connectible through the input clutches 18 and 20 and the synchronizers 22 and 24 with the sun gear member 34, the planet carrier member 50, the ring gear member 36, and the ring gear member 38. The output shaft 16 is selectively connectible with the sun gear member 34' and ring gear member 36 individually and simultaneously. It should also be evident that both the sun gear member 32 and the planet carrier member 50 can be selectively connected individually with the ground member 52. All of these connections are represented in both FIG. 1 and FIG. 2.

The selective engagement of the input clutches 18 and 20 and the synchronizers 22, 24, 26, and 28 will establish seven forward speed ratios and one reverse speed ratio between the input shaft 12 and the output shaft 16. The reverse speed ratio is established with the synchronizer 22 interconnecting the clutch 18 with the sun gear member 34, the synchronizer 30 28 connecting the carrier 50 with the ground element 52, and the synchronizer 26 connecting the output shaft 16 with the ring gear member 36. As can be most easily seen in the lever diagram of FIG. 2, the node 50A becomes the fulcrum, the node 34A becomes the input, and the node 36A is the output. If the node 34A is moved rightward about the fulcrum 50A, the node 36A will move leftward or opposite to the input. This is a reverse ratio. A neutral condition is established in the transmission by releasing the input clutch 18.

A first forward ratio is established by connecting the sun gear member 34 with the input clutch 18 through the synchronizer clutch 22, connecting the ring gear member 36 with the output shaft 16 through the synchronizer clutch 26, and connecting the sun gear member 32 with the ground element 52 through the synchronizer clutch 28. When the input clutch 18 is engaged, the sun gear member 34 will be rotated in unison with the input shaft 12, and the output shaft 16 will be rotated in the forward direction. This is most easily seen in the lever diagram of FIG. 2, when it is considered that the node 32A (sun gear member 32) is the ground member, the node 34A (sun gear members 34 and 34') is the input member, and the node 36A (ring gear member 36) is the output member. If the input speed is imposed on the node 34A, the output speed will be imposed on the node 36A in the same direction but at a much-reduced value. While the transmission is operating in the first ratio, the synchronizer clutch 24 can be shifted to engage the ring gear member 38. This can be done with no torque load since the input clutch 20 is disengaged.

To complete the engagement of the second ratio, the clutch 18 is disengaged while the clutch 20 is engaged. This moves the input node from the sun gear member 34 to the ring gear member 38, or as seen in the lever diagram, from the node 34A to the node 38A (ring gear member 38). The ground member and output member remain unchanged. Thus, it can be seen that the output speed represented at node 36A will increase due to a change in the lever values. During the second forward speed ratio, the synchronizers can be conditioned for either first or third ratio, and since the first ratio has been explained, the third ratio will be presented. During the second ratio, the synchronizer 22 is manipulated to engage the carrier 50 with the clutch 18.

To complete the interchange from second to third, the input clutches 20 and 18 are swapped, thereby changing the input path from the ring gear member 38 to the planet carrier member 50. The output member (ring gear member 36) and the ground member (sun gear member 32) remain the same. During the third forward speed ratio, the node 50A (planet carrier 50) becomes the input node, the node 36A remains the output node, and the node 32A remains the grounding node. As can be seen with the change in the lever relationships, the output node will have a larger value in the third ratio than was attained in the second ratio. The transmission can be changed from the third speed ratio to either the second speed ratio or the fourth speed ratio through manipulation of the synchronizers and the input clutches. Since the second speed ratio has already been explained, the fourth ratio will now be considered.

To initially establish the fourth ratio, the synchronizer 24 is manipulated to connect the input clutch 20 with the ring gear member 36. Then, by swapping the input clutches 18 and 20, the input shaft 12 will be connected directly through the ring gear member 36 with the output shaft 16 establishing a 1:1 ratio. There is no active ground member in the fourth ratio, thus preventing any reaction within the planetary gearset. The fourth forward speed ratio requires a relatively long engagement period compared with the other speed ratios since a series of manipulations must be undertaken in order to swap the output connection from the ring gear member 36 to the sun gear members 34 and 34'.

During the fourth forward speed ratio, the synchronizer 28 is initially moved to an open condition, thereby relieving either the sun gear member 32 or planet carrier member 50 from the ground connection. The synchronizer 26 remains in the condition to connect the ring gear member 36 with the input shaft 12, the synchronizer clutch 22 is manipulated to connect the sun gear member 34 with the input clutch 18, the synchronizer clutch 26 is manipulated to connect the output shaft 16 with both the sun gear member 34' and the ring gear member 32, thereby maintaining the transmission in a 1:1 ratio. The next occurrence within the transmission control is to engage the input clutch 18 and disengage the clutch 20. Therefore, the power path is from the input shaft 12 through the input clutch 18, and the sun gear members 34 and 34' to the output shaft 16. The next step during the fourth ratio is to set the synchronizer clutch 26 so that only the sun gear members 34 and 34' are connected with the output shaft 16.

Following this step, the synchronizer clutch 28 is manipulated to connect the sun gear member 32 with the ground element 52. Note, the power path remains through the input clutch 18, the synchronizer clutch 22, and the sun gear member 34' to the output shaft 16. To then complete the interchange from fourth to fifth forward speed ratios, synchronizer 24 is connected to ring gear 38 and the input clutch 18 is disengaged while the input clutch 20 is engaged, thereby changing the power path from the sun gear member 34' to the ring gear member 38 while the sun gear member 32 is grounded and the sun gear member 34' remains connected with the output shaft 16. Looking at the lever diagram in FIG. 2, it can be seen that when the node 38A (ring gear member 38) represents the input node and the node 34A (sun gear member 34') represents the output node with the node 32A (sun gear member 32) representing the fulcrum, an overdrive ratio is established.

During the fifth forward speed ratio, a downshift to the fourth ratio can be undertaken or an upshift to the sixth ratio can be undertaken. To prepare for the sixth ratio to be established, the synchronizer clutch 22 is manipulated to connect the input clutch 18 with the planet carrier member 50. To complete the sixth forward speed ratio, the input clutches 20 and 18 are interchanged such that the input power path is taken from the ring gear member 38 and placed on the planet carrier member 50. As seen in the lever diagram of FIG. 2, this results in a larger speed at the output node 34A, as the input node is moved from node 38A to node 50A, while the node 32A remains the fulcrum.

The transmission can then be manipulated to provide a seventh forward speed ratio or back to the fifth forward speed ratio. The elements of the seventh forward speed ratio are preselected from manipulating the synchronizer clutch 24 to engage with the ring gear member 36, while the output member (sun gear member 34') remains connected with the output shaft 16, and the sun gear member 32 remains connected with the ground element 52. When the synchronizer interchange is completed, the input clutches 18 and 20 can be interchanged. This will change the input power path from the planet carrier member 50 to the ring gear member 36 while. the ground member (sun gear member 32) remains constant. Again, reviewing the lever diagram of FIG. 2, it can be seen that when the input speed is represented as the node 36A, the output speed of the node 34A will be much larger and therefore an even larger overdrive speed is attained.

The downshifting from seventh to first is simply the opposite of the interchanges, which occurred during the upshifting. On reviewing these ratio interchanges, it should be evident that the oncoming speed ratio can be preselected through the synchronizer clutch assemblies prior to the input clutches 18 and 20 being interchanged. Thus, the interchange occurs without torque interruption between the input shaft 12 and the output shaft 16. This is one of the main purposes for using a dual input clutch-type transmission. This provides a significant improvement over single input clutch-type transmissions where the torque path between the engine and the input clutch is disengaged to permit manipulation of the oncoming speed ratio.

Figure 3:
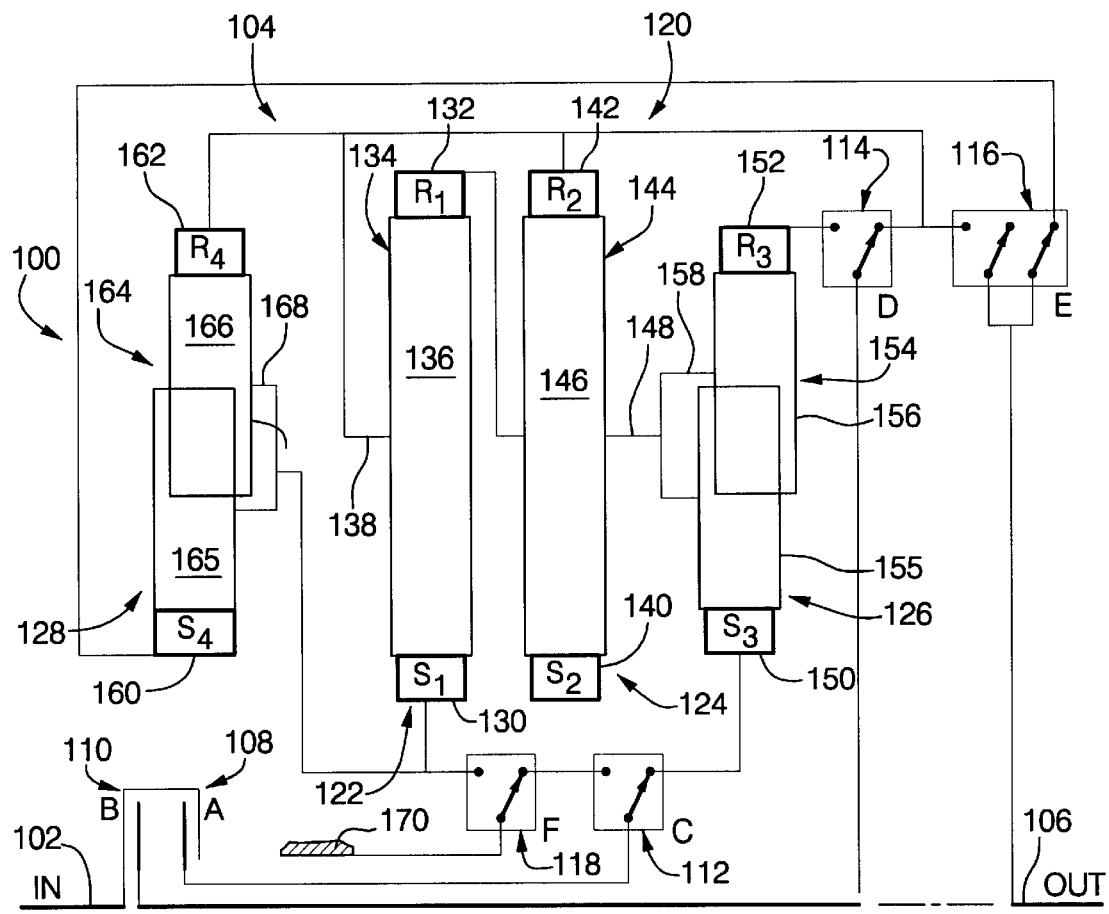
FIG. 3 is a schematic representation of a second embodiment of the present invention.

Referring to the alternate embodiment shown in FIG. 3, there is seen a power transmission 100 having an input shaft 102, a planetary transmission 104, and an output shaft 106. The planetary transmission 104 has two input clutches 108 and 110, four synchronizer or mechanical clutches 112, 114, 116, and 118, and a planetary arrangement 120. The planetary arrangement 120 includes four planetary gearsets 122, 124, 126, and 128.

The planetary gearset 122 includes a sun gear member 130, a ring gear member 132, and a planet carrier assembly member 134. The planet carrier assembly member 134 includes a plurality of pinion gears 136 rotatably mounted on a planet carrier member 138 and disposed in meshing relationship with both the sun gear member 130 and the ring gear member 132.

The planetary gearset 124 includes a sun gear member 140, a ring gear member 142, and a planet carrier assembly member 144. The planet carrier assembly member 144 includes a plurality of pinion gears 146 rotatably mounted on a planet carrier member 148 and disposed in meshing relationship with both the sun gear member 140 and the ring gear member 142.

The planetary gearset 126 is a compound planetary gearset including a sun gear member 150, a ring gear member 152, and a planet carrier assembly member 154. The planet carrier assembly member 154 includes a plurality of intermeshing pinion gears 155 and 156 that are rotatably mounted on a planet carrier member 158 and disposed in meshing relationship with the sun gear member 150 and the ring gear member 152, respectively.

The planetary gearset 128 is a compound planetary gearset including a sun gear member 160, a ring gear member 162, and a planet carrier assembly member 164. The planet carrier assembly member 164 includes a plurality of intermeshing pinion gears 165 and 166 that are rotatably mounted on a planet carrier member 168 and disposed in meshing relationship with the sun gear member 160 and the ring gear member 162, respectively.

The planet carrier member 138, ring gear member 142, and ring gear member 162 are continuously interconnected with each other and drivingly connected with the synchronizer clutches 114 and 116. The sun gear member 130 and the planet carrier member 168 are continuously interconnected and are drivingly connected with the synchronizer clutch 118. The ring gear member 132, the planet carrier member 148, and planet carrier member 158 are continuously interconnected and drivingly connected with the synchronizer clutches 112 and 118. The sun gear members 140 and 150 are continuously interconnected and drivingly connected with the synchronizer clutch 112.

The sun gear member 160 is drivingly connected with the synchronizer clutch 116. The input clutches 108 and 110 are drivingly connected with the synchronizer clutches 112 and 114, respectively. The output shaft 106 is drivingly connected with the synchronizer clutch 116. The synchronizer clutch 118 is drivingly connected with a grounding member 170.

It should be noted that the synchronizers 112 and 114 provide alternate inputs for the planetary arrangement 120. The synchronizer clutch 112 provides an input path to the sun gear members 140 and 150 in one position, and an input path to the planet carrier members 148, 158, and ring gear member 132 in the other position. The synchronizer clutch 114 provides an input path to the ring gear member 152 in one position, and to the ring gear members 142, 162 and planet carrier member 138 in the other position. The synchronizer clutch 116 provides alternative connections between the sun gear member 160 and the output shaft 106, and a connection between the ring gear members 162, 142 and planet carrier member 138 in another position, and a connection between all of the above-mentioned gear members in the third position. The synchronizer 118 provides selective connections between the ground member 170 and the planet carrier members 148, 158 and ring gear member 132, and in the other position with sun gear member 130, planet carrier member 138, and ring gear members 152 and 142. The synchronizer clutches 112 and 114 are selectively connectible with the input shaft 102 through the input clutches 108 and 110, respectively.

Figure 4:
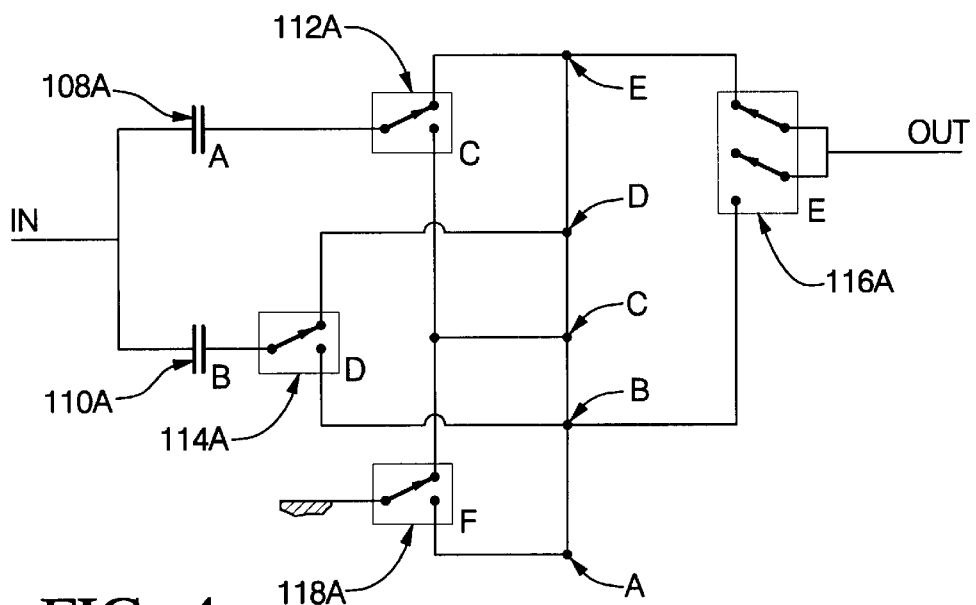
FIG. 4 is a lever diagram representation of the embodiment shown in FIG. 3.

As with the planetary arrangement 30, shown in FIG. 1, the planetary arrangement 120 can be collapsed into a five-node lever diagram, which is shown in FIG. 4. In FIG. 4, the input clutches and the synchronizer clutches have been given the same numerical designation as those elements shown in FIG. 3 with an "A" suffix. The nodes of the lever diagram are designated as A, B, C, D, and E. The node A represents the sun gear member 130, planet carrier member 168, and sun gear member 160. The node B represents the ring gear member 142, the planet carrier member 138, and the ring gear member 162. The node C represents the planet carrier member 148, the ring gear member 152, and the planet carrier member 158. The node D represents the ring gear member 152, and the node E represents the sun gear members 140 and 150 during the underdrive ratios, and the sun gear member 160 during the overdrive ratios.

During the reverse ratio, the sun gear member 140 (node E) is connected with the input shaft 102 through the input clutch 108, the planet carrier member 148 (node C) is connected with the ground member 170, and the ring gear member 142 (node B) is connected with the output shaft 106 through the synchronizer clutch 116. When at least both of the input clutches 108 and 110 are disengaged, the transmission is in a neutral condition.

The first forward speed ratio is established by connecting the node A to ground, the node E to the input shaft, and the node B to the output shaft. The second forward speed ratio is preselected by connecting node D to clutch 110A and then swapping the clutches 110 and 108 to complete the shift or ratio interchange. The third forward speed ratio is preselected by connecting the node C through the synchronizer clutch 112A with the input clutch 108A and then interchanging the clutches 108 and 110 to complete the shift. The fourth forward speed ratio is preselected by interconnecting the input clutch 110 through the synchronizer 114 with the output shaft 106 represented by node B. Then, the shift to initiate the fourth forward speed ratio is established with the interchange of the input clutches 108 and 110. As with the planetary arrangement 30 described above, the fourth forward speed ratio is a direct drive, which undergoes a series of manipulations to arrange the synchronizers in proper location for the upshift to fifth ratio.

The final stage of the fourth forward speed ratio has the input clutch 108 engaged; the synchronizer 112 connected with the sun gear members 140 and 150 (node E); and the output shaft 106 connected through the synchronizer clutch 116 with the sun gear member 160, which is also represented at node E. The fifth forward speed ratio is established from this condition by interchanging the input clutches 108 and 110 to establish node D as the input node and node E as the output node, while the node A is the reaction node. The sixth forward speed ratio is preselected by connecting the node C with the input clutch 108. The nodes E and A remain as connected previously. The fifth-to-sixth interchange is completed by disengaging the clutch 110 while engaging the clutch 108. The seventh forward speed ratio is preselected by connecting the node B with the input clutch 110A. The nodes E and A remain, as selected in the sixth ratio. The sixth-to-seventh interchange is completed by swapping the clutches 108 and 110, thereby completing the input interconnection with the node B.

From the above descriptions of the embodiments shown in FIGS. 1 and 3, it should now be evident that seven forward speed ratios and one reverse speed ratio can be provided in a dual input clutch-type transmission having incorporated therein a planetary gear arrangement, which has either three or four planes of meshing gears. The planetary arrangement in FIG. 1 has three planes of meshing gears while the planetary arrangement in FIG. 3 has four planes of meshing gears. Each of the embodiments incorporates three two-position synchronizers and one three-way synchronizer, as well as two selectively engageable input clutches. The synchronizers and input clutches are controlled in a conventional manner, which might incorporate an electronic control unit having the components thereof being a preprogrammable digital computer. These types of controls are well known.

As an alternative, the synchronizer clutches can be manually manipulated and the input clutches 110 and 108 will be hydraulically manipulated. The manual manipulation is not preferable since this requires considerable movement on the part of the operator. Therefore, the automatic interchange of the synchronizers is the preferred control method and this can be accomplished with a conventional electro-hydraulic control unit.

What is claimed is:

1. A power transmission comprising;
    an input shaft;
    an output shaft;
    a first selectively engageable input clutch;
    a second selectively engageable input clutch;
    a planetary gear arrangement comprising:
        at least six rotatable planetary members;
        a first synchronizer clutch selectively engaging said first selectively engageable input clutch with each of a first and second of said rotatable planetary members individually
        a second synchronizer clutch selectively engaging said second selectively engageable clutch with each of a third and a fourth of said rotatable planetary members individually
        a third synchronizer clutch selectively connecting said output shaft with each of said fourth and a fifth of said rotatable planetary members individually
        a fourth synchronizer clutch selectively connecting a ground member with each of said second and a sixth of said rotatably planetary members individually and
        said first and second selectively engageable input clutches and said four synchronizer clutches being engaged in a plurality of combinations to establish seven forward speed ratios and one reverse speed ratio between said input shaft and said output shaft.

2. The power transmission defined in claim 1 further comprising:
    said third synchronizer clutch being connected between said output shaft and said fourth rotatable planetary member during at least three of said forward speed ratios, and being connected between said output shaft and said fifth of said rotatable planetary member; and
    said fourth synchronizer clutch being connected between said second rotatable planetary member and said ground member during at least six of said forward speed ratios.

3. The power transmission defined in claim 1 further wherein said planetary gear arrangement, and said selectively engageable input clutches are represented by a five node lever diagram wherein said first and fifth rotatable members are represented by one of said five nodes.

4. The power transmission defined in claim 1 further comprising:

said first rotatable planetary member, said fifth rotatable planetary member, and said sixth rotatable planetary member including at least a sun gear member.

5. The power transmission defined in claim 1 further comprising:

said second rotatable planetary member including at least a planet carrier member.

6. The power transmission defined in claim 1 further comprising:

said third rotatable planetary member and s aid fourth rotatable planetary member including at least a ring gear member.

\* \* \* \* \*